United States Patent [19]
Frank et al.

[11] Patent Number: 5,931,502
[45] Date of Patent: Aug. 3, 1999

[54] D-RING HEIGHT ADJUSTER

[75] Inventors: Matthew C. Frank, Troy; Bob L. McFalls, Shelby Township; Robert D. Sayles, Rochester, all of Mich.

[73] Assignee: TRW Vehicle Safety Systems Inc., Lyndhurst, Ohio

[21] Appl. No.: 08/929,131

[22] Filed: Sep. 5, 1997

Related U.S. Application Data

[63] Continuation-in-part of application No. 08/783,193, Jan. 15, 1997, Pat. No. 5,794,977.

[51] Int. Cl.$^6$ .................................................. B60R 22/20
[52] U.S. Cl. ........................................ 280/801.2; 280/808
[58] Field of Search ............................... 280/801.2, 808; 297/483

[56] References Cited

U.S. PATENT DOCUMENTS

| | | | |
|---|---|---|---|
| 4,538,832 | 9/1985 | Anderson | 280/801.2 |
| 4,610,464 | 9/1986 | Yasumatsu et al. | 280/801.2 |
| 4,711,498 | 12/1987 | Adomeit | 297/468 |
| 4,973,084 | 11/1990 | Biller | 280/801.2 |
| 5,167,428 | 12/1992 | Garret et al. | 280/801.2 |
| 5,265,908 | 11/1993 | Verellen et al. | 280/801.2 |
| 5,280,959 | 1/1994 | Nanbu | 280/808 |

*Primary Examiner*—Peter C. English
*Attorney, Agent, or Firm*—Tarolli, Sundheim, Covell, Tummino & Szabo

[57] ABSTRACT

A seat belt webbing guide height adjuster (10) includes a base (50) having first and second columns of openings (84, 86, 104, 106) disposed in a staggered relationship on opposite sides of an axis (61). A carriage (140) is supported on the base (50) for axial movement relative to the base. A seat belt webbing guide (24) is disposed on the carriage (140). A first latch part (200) on the carriage (140) is movable between a first condition in which the first latch part is movable axially past the first openings (84, 86) and a second condition in which the first latch part is located in one of the first openings to block axial movement of the first latch part and the carriage relative to the base (50). A second latch part (210) on the carriage (140) is movable between a first condition in which the second latch part is movable axially past the second openings (104, 106) and a second condition in which the second latch part is located in one of the second openings to block axial movement of the second latch part and the carriage relative to the base (50). The height adjuster (10) includes springs (228, 246) for biasing the first and second latch parts (200, 210) into the second condition, and a release lever (260) for moving the first and second latch parts to the first condition.

8 Claims, 4 Drawing Sheets

D-RING HEIGHT ADJUSTER

RELATED APPLICATION

This application is a continuation-in-part of U.S. patent application Ser. No. 08/783,193, filed Jan. 15, 1997, U.S. Pat. No. 5,794,911 by the same inventor, entitled "D-Ring Height Adjuster".

BACKGROUND OF THE INVENTION

1. Technical Field

The present invention relates to a vehicle occupant safety apparatus and, in particular, to a vehicle seat belt system including a seat belt webbing height adjuster and a pretensioner for taking up slack in the seat belt in the event of a vehicle collision.

2. Description of the Prior Art

Vehicle seat belt systems use seat belt webbing to restrain movement of a vehicle occupant. It is known to include a pretensioner in such a system. In the event of vehicle deceleration above a predetermined threshold level, such as occurs in a vehicle collision, the pretensioner is actuated to tension the belt webbing and to take up slack in the belt webbing.

It is also known to include a manually adjustable seat belt webbing height adjuster in a seat belt system. The belt webbing passes through a seat belt webbing guide or D-ring that is supported on the height adjuster at a location adjacent to the shoulder of the vehicle occupant. The height adjuster enables the vehicle occupant to set the vertical position of the D-ring to one of several vertically spaced locking positions. In some height adjusters, the D-ring can, at times, be positioned vertically between locking positions.

Some seat belt systems include both a pretensioner and a height adjuster. When the pretensioner is actuated, the tensioned belt webbing exerts a strong downward force on the D-ring. If the pretensioner is actuated when the D-ring is not at a locking position, the D-ring is pulled downward along the height adjuster until it locks. It is desirable to ensure that the D-ring locks at the next available downward locking position and does not skip past one or more locking positions before engaging.

SUMMARY OF THE INVENTION

The present invention is a seat belt webbing guide height adjuster comprising a base having first and second columns of openings disposed in a staggered relationship on opposite sides of an axis of the height adjuster. A carriage is supported on the base for axial movement relative to the base. A seat belt webbing guide is disposed on the carriage. A first latch part on the carriage is movable between a first condition in which the first latch part is movable axially past the first openings and a second condition in which the first latch part is located in one of the first openings to block axial movement of the first latch part and the carriage relative to the base. A second latch part on the carriage is movable between a first condition in which the second latch part is movable axially past the second openings and a second condition in which the second latch part is located in one of the second openings to block axial movement of the second latch part and the carriage relative to the base. The height adjuster includes biasing means for biasing the first and second latch parts into the second condition, and actuatable release means for moving the first and second latch parts to the first condition.

BRIEF DESCRIPTION OF THE DRAWINGS

Further features of the present invention will become apparent to one skilled in the art to which the present invention relates from reading the following specification with reference to the accompanying drawings, in which.

DESCRIPTION OF A PREFERRED EMBODIMENT

Figures 1, 6:
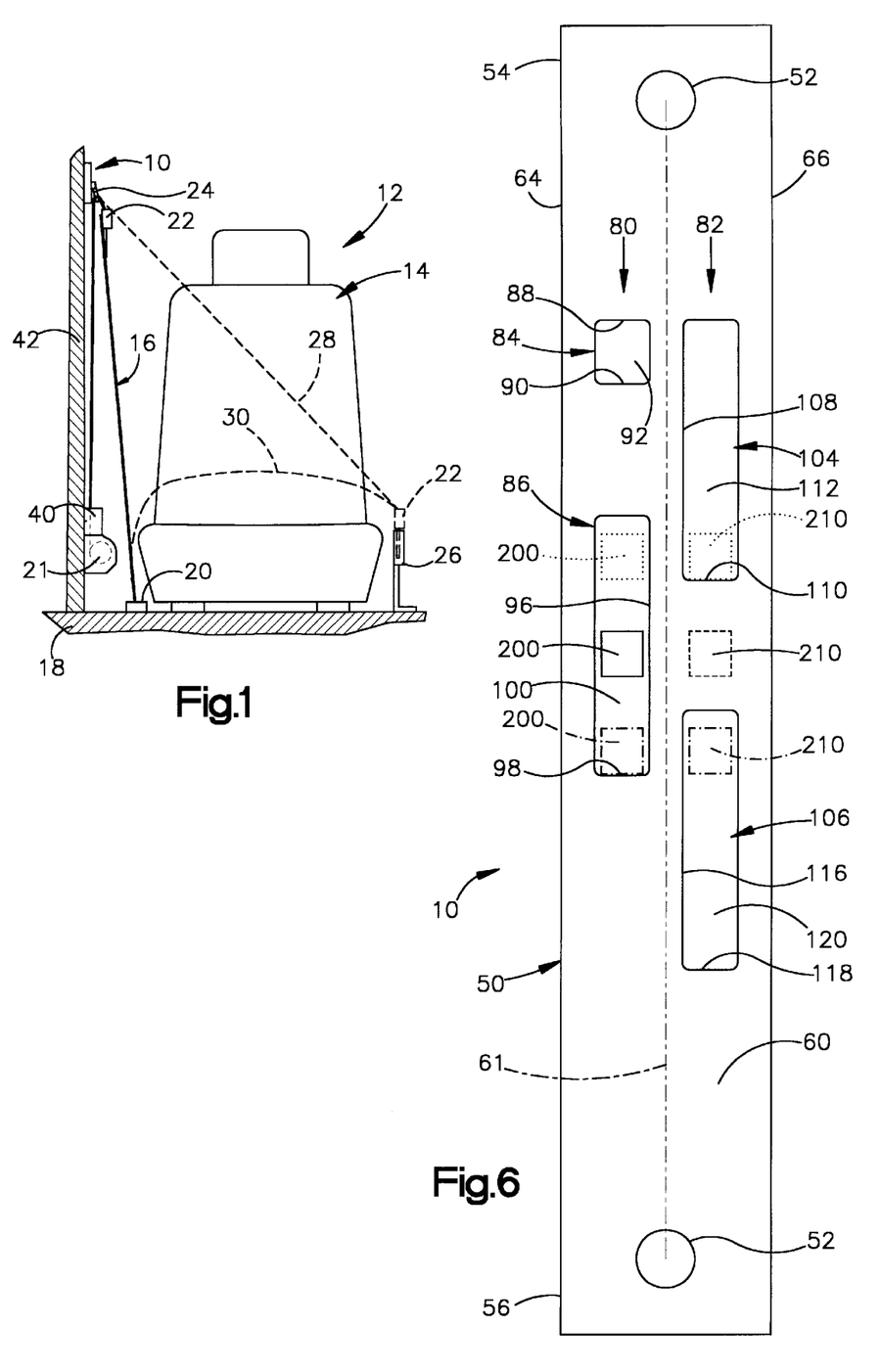
FIG. 1 is a schematic illustration of a vehicle seat belt system including a pretensioner and a seat belt webbing guide height adjuster constructed in accordance with the present invention.
FIG. 6 is a schematic illustration showing relative locking positions of the height adjuster of FIG. 1.

The present invention relates to a vehicle seat belt webbing guide height adjuster. As representative of the present invention, FIG. 1 illustrates a vehicle seat belt webbing guide height adjuster 10. The height adjuster 10 is incorporated in a three-point continuous loop seat belt system 12 for use in restraining an occupant of a vehicle.

During operation of the vehicle, the occupant of the vehicle sits on a seat 14 in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a retractor 21 which is secured to the vehicle body on the same side of the seat 14.

Intermediate its ends, the belt webbing 16 passes through a tongue assembly 22 and a seat belt webbing guide or D-ring 24 that is located above the retractor 21 and the anchor point 20. The D-ring 24 is supported on the height adjuster 10 in a manner described below. When the seat belt system 12 is not in use, the belt webbing 16 is wound on the retractor 21 and is oriented generally vertically on the one side of the seat 14, as shown in solid lines in FIG. 1.

To engage the seat belt system 12, the tongue Lit assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 21. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

The seat belt system 12 includes a pretensioner 40 connected with the belt webbing 16. The pretensioner 40 is disposed adjacent to, or may be incorporated in, the retractor 21. The pretensioner 40 is actuatable to tension the belt webbing 16 in a manner described below to take up slack in the belt webbing.

Figure 2:
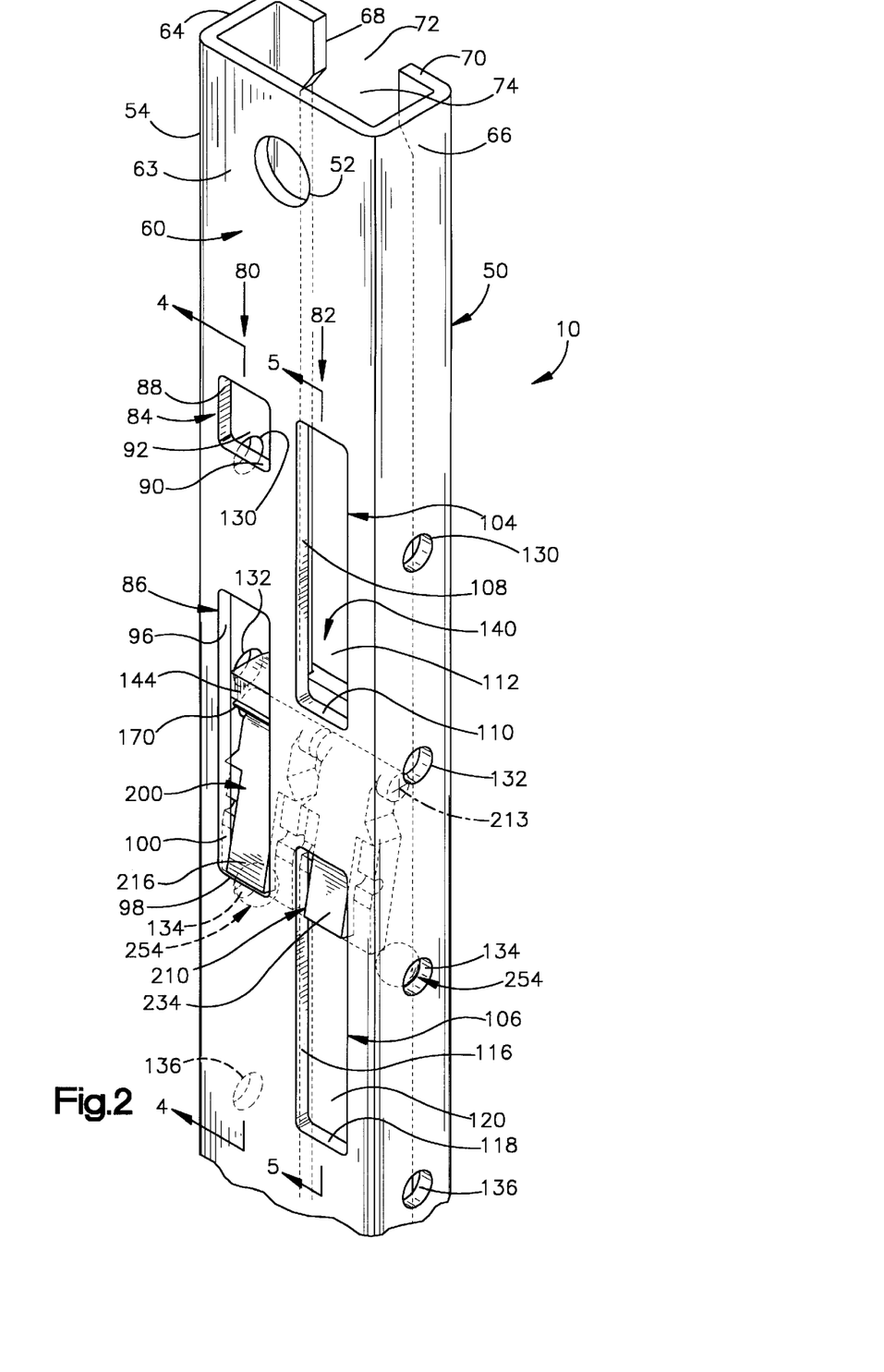
FIG. 2 is a perspective view of a portion of the height adjuster with parts removed.

The D-ring height adjuster 10 (FIGS. 2–6) includes a rail or base 50 which is secured to a portion of the vehicle, such as the vehicle B-pillar 42, by fasteners (not shown) extending through a pair of fastener openings 52. The base 50 could, alternatively, be formed as a portion of the vehicle itself. The base 50 extends generally vertically in the vehicle and has an upper end portion 54 and an opposite lower end portion 56. The base 50 is preferably formed from steel with a generally C-shaped cross-sectional configuration as viewed from above (FIG. 2). The base 50 includes a back wall 60 which extends parallel to an axis 61 of the height adjuster 10. The back wall 60 has parallel inner and outer major side surfaces 62 and 63.

Spaced, parallel side walls 64 and 66 of the base 50 extend outward from the back wall 60. Front walls 68 and 70 of the base 50 are spaced from the back wall 60 and extend toward each other from the side walls 64 and 66, respectively, to define an axially extending slot 72 in the base 50. The walls 60, 64, 66, 68 and 70 of the base 50 define an axially extending central passage 74 in the base. The slot 72 opens into the central passage 74.

The base 50 includes first and second columns 80 and 82 of locking features on opposite sides of the axis 61. In the preferred embodiment, the locking features 80 and 82 are slots or openings in the back wall 60 of the base 50. The openings extend between the inner and outer major side surfaces 62 and 63 of the back wall 60 of the base. The first and second columns 80 and 82 of openings are spaced apart on opposite sides of the axis 61.

The first column 80 of openings includes, in the illustrated embodiment, an upper first opening 84 and a lower first opening 86. The upper first opening 84 has a rectangular configuration defined by a generally rectangular edge surface 88. The edge surface 88 has a lower end portion 90 oriented perpendicular to the axis 61. The lower end portion 90 of the edge surface 88 forms the lower boundary of a lower end portion 92 of the upper first opening 84.

The lower first opening 86 is disposed vertically below the upper first opening 84. The lower first opening 86 has a vertically elongate, rectangular configuration defined by a generally rectangular edge surface 96. The edge surface 96 has a lower end portion 98 oriented perpendicular to the axis 61. The lower end portion 98 of the edge surface 96 forms the lower boundary of a lower end portion 100 of the lower first opening 86. A portion 102 (FIG. 4) of the inner major side surface 62 of the back wall 60 extends between the two first openings 84 and 86.

The second column 82 of openings includes, in the illustrated embodiment, an upper second opening 104 and a lower second opening 106 in the base 50. The upper second opening 104 is identical to the lower first opening 86 and has a vertically elongate, rectangular configuration defined by a generally rectangular edge surface 108. The edge surface 108 has a lower end portion 110 oriented perpendicular to the axis 61. The lower end portion 110 of the edge surface 108 forms the lower boundary of a lower end portion 112 of the upper second opening 104.

The lower second opening 106 is disposed vertically below the upper second opening 104. The lower second opening 106 is identical to the upper second opening 104 and has a vertically elongate, rectangular configuration defined by a generally rectangular edge surface 116. The edge surface 116 has a lower end portion 118 oriented perpendicular to the axis 61. The lower end portion 118 of the edge surface 116 forms the lower boundary of a lower end portion 120 of the lower second opening 106. A portion 122 (FIG. 5) of the inner major side surface 62 of the back wall 60 extends between the two second openings 104 and 106.

The first openings 84 and 86 and the second openings 104 and 106 are staggered relative to each other; that is, they are placed alternately on either side of the axis 61. As a result of this staggered arrangement of the openings in the base 50, there is at least one opening in the back wall 60 of the base, on one side of the axis 61 or the other, at any vertical location along the entire extent of the base between the upper first opening 84 and the lower end portion 120 of the lower second opening 106.

Specifically, the lower end portion of each one of the three uppermost openings 84, 86, and 104 is axially coextensive with, or lies horizontally opposite, a latch opening on the other side of the axis 61. For example, the lower end portion 92 of the upper first opening 84 (FIG. 2) is at the same vertical position along the base 50 as (is axially coextensive with) an upper portion of the upper second opening 104. The lower end portion 112 of the upper second opening 104 is at the same vertical position along the base 50 as an upper portion of the lower first opening 86. The lower end portion 100 of the lower first opening 86 is at the same vertical position along the base 50 as an upper portion of the lower second opening 106.

In addition to the four latch openings 84, 86, 104 and 106, the base 50 includes four pairs of circular detent openings 130, 132, 134 and 136 formed in the side walls 64 and 66 of the base. Each pair of detent openings 130, 132, 134 and 136 is located slightly below one of the four latch openings 84, 86, 104 and 106. Specifically, the uppermost pair of detent openings 130 is located slightly below the upper first latch opening 84. The next pair of detent openings 132 is located slightly below the upper second latch opening 104. The detent openings 134 are located slightly below the lower first latch opening 86. The lowermost pair of detent openings 136 is located slightly below the lower second latch opening 106.

The height adjuster 10 includes a carriage 140 (FIGS. 3–5) which is slidable axially along the base 50. The carriage 140 (FIG. 3) includes a plastic glider 142 and a metal slider plate 144. The glider 142 has two pairs of flanges 146 and 148 which slidably engage the opposite front walls 68 and 70, respectively, of the base 50. The flanges 146 and 148 support the glider 142 on the base 50 for sliding movement relative to the base. In the lower portion of the glider 142 is a spacer window 148 partially defined by a pair of flats 150 located on opposite sides of the spacer window. A link window 152 is located above the spacer window 148.

The slider plate 144 (FIG. 3) has an upside down, L-shaped cross-sectional configuration as viewed from the side. An outer wall 154 of the slider plate 144 is parallel to, and spaced apart from, the back wall 60 of the base 50. An upper arm 156 of the slider plate 144 projects from the outer wall 154 in a direction toward the back wall 60 of the base 50. A circular window 160 in the slider plate 144 is aligned with the spacer window 148 of the glider 142. The slider plate 144 also has a link window 158 that is aligned with the link window 152 of the glider.

Figure 3:
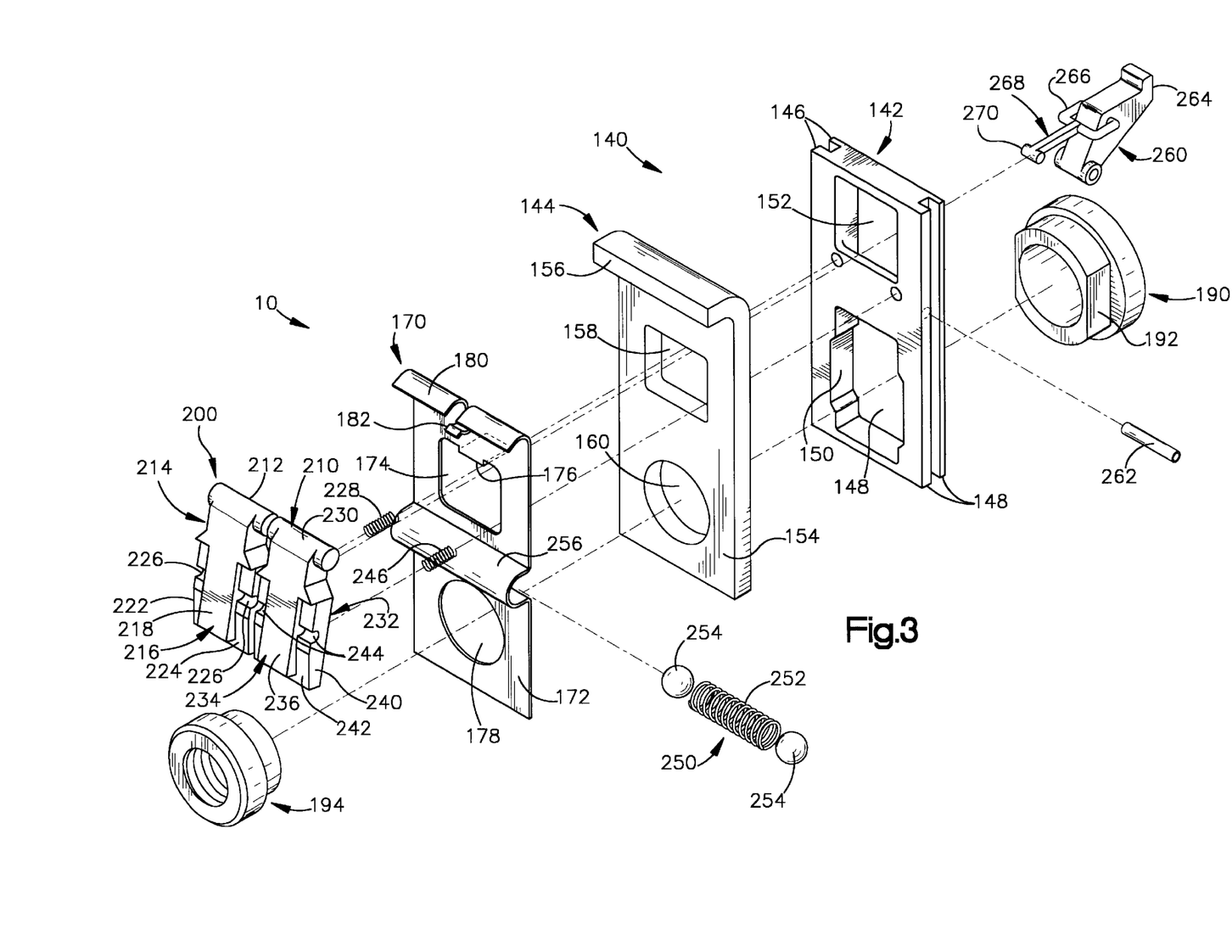
FIG. 3 is an exploded perspective view, partially broken away, of parts of the height adjuster.

The carriage 140 also includes a retainer 170. The retainer 170 is a sheet metal member having a planar main wall 172. A link window 174 in the main wall 172 of the retainer 170 is aligned with the link window 158 in the slider plate 144. A tab 176 on the retainer 170 extends through the link window 158 in the slider plate 144 and holds the retainer in position on the slider plate. A circular opening 178 in the retainer 170 is aligned with the circular window 160 in the slider plate 144.

An upper wall 180 of the retainer 170 projects from the main wall 172 in a direction toward the back wall 60 of the base 50. The upper wall 180 of the retainer 170 is disposed below and in abutting engagement with the upper wall 156 of the slider plate 144. A latch support tab 182 projects from the main wall 172 of the retainer 170 in a direction toward the back wall 60 of the base 50, intermediate the upper wall 180 and the link window 174.

A spacer 190 extends into the spacer window 148 of the glider 142. Flats 192 on the spacer 190 engage the flat side surfaces 150 on the glider 142. A nut 194 extends through the circular opening 178 in the retainer 170 and into the circular window 160 in the slider plate 144. A support bolt 196 (FIGS. 4 and 5) extends through the spacer 190, the glider 142, the slider plate 144 and the retainer 170 and is screwed into the nut 194. The support bolt 196 clamps the slider plate 144 to the glider 142 so that the slider plate and the retainer 170 are supported on the base 50 for vertical movement with the glider and the support bolt. The D-ring 24 is pivotally mounted on the shank of the support bolt 196 for vertical movement with the support bolt.

The height adjuster 10 includes identical first and second latch parts or latches 200 and 210 spaced apart on opposite sides of the axis 61. The latches 200 and 210 are made from steel. The first latch 200 has an upper end portion 212. The upper end portion 212 of the first latch 200 is disposed between the upper wall 180 of the retainer 170 and the latch support tab 182 (FIG. 3) of the retainer. The first latch 200 is, thereby, supported for pivotal movement about a pivot axis 213 (FIGS. 2 and 4), relative to the retainer 170, the slider plate 144, the glider 142 and the base 50. The first latch 200 is pivotable relative to the slider plate 144, through a range of about 16°, as described below.

A main body portion 214 of the first latch 200 extends downward from the upper end portion 212. The main body portion 214 of the first latch 200 includes a nose 216 which has a planar back surface 218. The nose 216 has an arcuate lower end surface 220 (FIG. 4) centered on the pivot axis 213 of the first latch 200.

Figure 4:
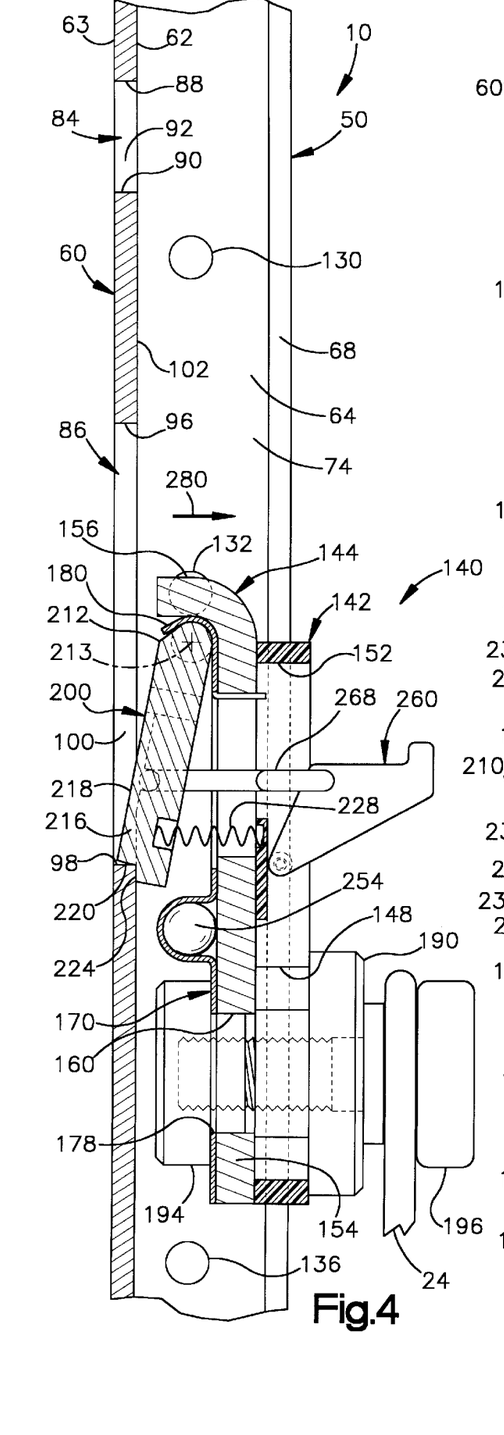
FIG. 4 is a longitudinal sectional view of the height adjuster, taken along line 4—4 of FIG. 2, showing parts of the height adjuster in a locking condition.

A flange portion 222 of the first latch 200 has a planar back surface 224 which wraps around and under the nose 216 in a generally U-shaped configuration. The back surface 224 of the flange portion 222 of the first latch 200 extends at an angle of about 16° to the back surface 218 of the nose 216 of the first latch. A pair of link recesses 226 are formed in the flange portion 222 of the first latch 200, on opposite sides of the nose 216.

The height adjuster 10 includes a first spring 228 which acts between the glider 142 and the first latch 200. The first spring 228 biases the first latch 200 away from the glider 142 in a direction toward the back wall 60 of the base 50 (to the left as viewed in FIGS. 3 and 4). The first spring 228 can be of many types, including a compression coil spring, as shown, a leaf spring, or a resilient portion of either the first latch 200, the retainer 170, the slider plate 144, or the glider 142.

The second latch 210 (FIGS. 3 and 5) is identical in configuration to the first latch 200. The second latch 210 has an upper end portion 230 disposed between the upper wall 180 of the retainer 170 and the latch support tab 182 of the retainer. The second latch 210 is, thereby, supported for pivotal movement about the pivot axis 213, relative to the retainer 170, the slider plate 144, the glider 142 and the base 50. The second latch 210 is pivotable relative to the slider plate 144, through a range of about 16°, as described below.

A main body portion 232 of the second latch 210 extends downward from the upper end portion 230. The main body portion 232 includes a nose 234 which has a planar back surface 236. The nose 234 has an arcuate lower end surface 238 (FIG. 5) centered on the pivot axis 213 of the second latch 210.

Figure 5:
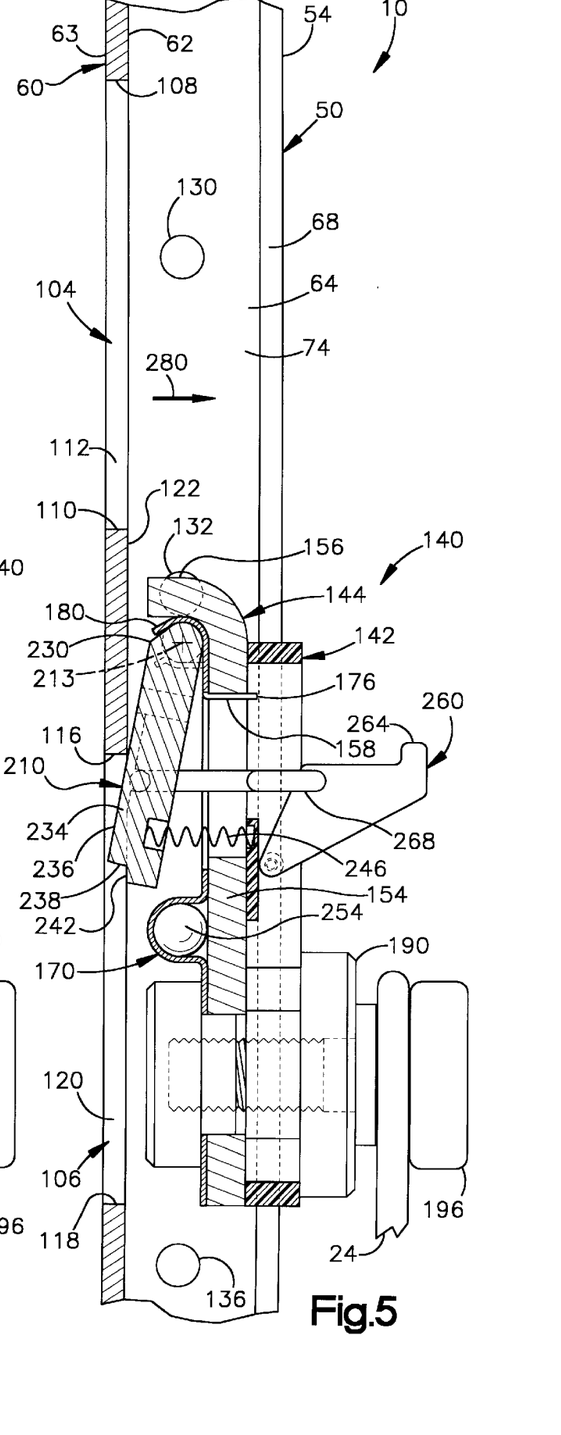
FIG. 5 is a view similar to FIG. 4, taken along line 5—5 of FIG. 2, showing parts of the height adjuster in a ready condition.

A flange portion 240 of the second latch 210 has a planar back surface 242 which wraps around and under the nose 234 in a generally U-shaped configuration. The back surface 242 of the flange portion 240 of the second latch 210 extends at an angle of about 16° to the back surface 236 of the nose 234 of the second latch. A pair of link recesses 244 are formed in the flange portion 240 of the second latch 210, on opposite sides of the nose 234.

The height adjuster 10 includes a second spring 246 which acts between the glider 142 and the second latch 210. The second spring 246 biases the second latch 210 away from the glider 142 in a direction toward the back wall 60 of the base 50 (to the left as viewed in FIGS. 3 and 5).

The height adjuster 10 includes a detent assembly 250 (FIG. 3). The detent assembly includes a detent spring 252 and a pair of detent members 254 in the form of steel balls. The detent spring 252 extends horizontally in a cylindrical portion 256 of the retainer 170. The detent spring 252 biases the detent balls 254 outwardly into engagement with the side walls 64 and 66 of the base 50. The detent balls 254 are selectively engageable in the detent openings 130–136 in the side walls 64 and 66 of the base 50 to hold the carriage 140 in a selected locking position, as described below.

The height adjuster 10 includes a release lever 260 (FIGS. 3–5) for moving the first and second latches 200 and 210 in a direction away from the back wall 60 of the base 50 to permit sliding movement of the carriage 140 relative to the base. The release lever 260 is supported on a pivot pin 262 on the glider 142 for pivotal movement relative to the glider. A manually engageable portion 264 of the release lever 260 is disposed in the vehicle occupant compartment, above the D-ring 24. One end portion 266 of a release link 268 is supported on the release lever 260 for pivotal movement relative to the release lever. The opposite end portion 270 of the release link 268 engages in adjacent link recesses 226 and 244 in the first and second latches 200 and 210, respectively. The biasing force of the latch springs 228 and 246 normally maintains the release lever 260 in an unactuated condition as shown in FIGS. 3 and 4.

Each one of the latches 200 and 210 has four possible conditions relative to the base 50, depending on whether the release lever 260 is actuated and depending on the vertical position of the carriage 140 relative to the base.

When the release lever 260 is actuated, that is, the manually engageable portion 264 is pressed down, the release link 268 pulls the latches 200 and 210 in a direction away from the back wall 60 of the base 50, as indicated by the arrow 280 in FIGS. 4 and 5. The latches 200 and 210 are moved far enough away from the back wall 60 so that both latches are movable vertically without engaging the back wall and without entering into any of the openings 84, 86, 104 and 106, on the base 50. The latches 200 and 210 are in a disengaged condition.

When the release lever 260 is not actuated, the springs 228 and 246 bias the latches 200 and 210, respectively, into engagement with the back wall 60 of the base 50. Each one of the latches 200 and 210 has three possible conditions in engagement with the back wall 60, depending on the vertical position of the carriage 140 relative to the base 50.

The first of these three conditions is a locking condition. FIGS. 2 and 4, as an example, illustrate the first latch 200 in the locking condition. The nose 216 of the first latch 200 is in the lower end portion 100 of the lower first latch opening 86. The lower end surface 220 (FIG. 4) on the nose 216 is in abutting engagement with the lower end portion 98 of the edge surface 96. The position of the first latch 200 in the opening 86 immediately blocks downward movement of the first latch 200 relative to the base 50.

FIG. 6 also illustrates schematically the latches 200 and 210 in the locking condition. The first latch 200, as shown in dash-dot lines in one vertical position relative to the base 50, is in a locking condition in the lower first opening 86. The second latch 210, as shown in dotted lines in another vertical position relative to the base 50, is in a locking condition in the upper second opening 104.

The vertical positions of the detent openings 130–136, relative to the latch openings 84, 86, 104 and 106, are selected so that there is always one latch in a locking condition whenever the detent balls 254 are engaged in the detent openings. Specifically, when the detent balls 254 are engaged in the uppermost detent openings 130, the first latch 200 is in the locking condition. The nose 216 of the first latch 200 is disposed in the lower end portion 92 of the upper first opening 84 in the base 50. When the detent balls 254 are engaged in the detent openings 132, the second latch 210 is in the locking condition. The nose 234 of the second latch 210 is in the lower end portion 112 of the upper second opening 104 in the base 50.

When the detent balls 254 are engaged in the detent openings 134, the first latch 200 is in the locking condition. The nose 216 of the first latch 200 is in the lower end portion 100 of the lower first opening 86 in the base 50. When the detent balls 254 are engaged in the lowermost detent openings 136, the second latch 210 is in the locking condition. The nose 234 of the second latch 210 is in the lower end portion 120 of the lower second opening 106 in the base 50.

When one of the latches 200 and 210 is in the locking condition, its flange portion is in abutting engagement with the back wall 60 of the base 50. For example, when the first latch 200 (FIG. 4) is in the locking condition, its flange portion 222 is in abutting engagement with the back wall 60 of the base 50. The back surface 224 on the flange portion 222 of the first latch 200 is in abutting engagement with the inner side surface 62 on the back wall 60. The engagement of the flange portion 222 of the first latch 200 with the back wall 60 of the base 50 blocks movement of the first latch through the opening 86, and limits or controls how far the first latch can pivot from the released or disengaged condition.

The second of the three possible conditions in which each one of the latches 200 and 210 can be located, when the release lever 260 is not actuated, is a "ready" condition. A latch 200 or 210 is in an "engaged" condition when it is in either the ready condition or the locking condition. A latch 200 or 210 is in a ready condition when the nose of the latch is in one of the latch openings 84, 86, 104 or 106 but is not in the lower end portion of the one opening. FIG. 5, as an example, illustrates the second latch 210 in the ready condition in the lower second opening 106. The second latch 210 is not in a position immediately to block downward movement of the second latch relative to the base 56.

FIG. 6 also illustrates schematically the ready condition of the latches 200 and 210. The first latch 200 is shown in two different positions relative to the base 50, in dotted lines and in solid lines, in a ready condition in the lower first opening 86. The second latch 210, as shown in dash-dot lines, is in a ready condition in the lower second opening 106.

The third possible condition in which each one of the latches 200 and 210 can be located, when the release lever 260 is not actuated, is an "intermediate" condition. FIG. 6, as an example, illustrates schematically, in dashed lines because it is hidden, the second latch 210 in the intermediate condition. The second latch 210 is disposed vertically between the two second latch openings 104 and 106, in engagement with the inner side surface 62 of the back wall 60 of the base 50.

This intermediate condition of a latch 200 or 210 typically occurs only during movement of the carriage 140 between one of the four detent positions. This is because whenever the detent balls 254 are engaged in the detent openings 130–136, each one of the latches 200 or 210 is in either a locking condition or a ready condition. The exception is when the second latch 210 is in the lower end portion 120 of the lower second opening 106, in which case the height adjuster 10 is in its lowermost position and the first latch 200 is disposed below both of the first latch openings 84 and 86.

The height adjuster 10 is manually operable by an occupant of the vehicle seat 14 to adjust the vertical position of the D-ring 24. To adjust the vertical position of the D-ring 24 downward, the vehicle occupant actuates the release lever 260 by moving the manually engageable portion 264 of the release lever downward. The release lever 260 pivots relative to the glider 142 and pulls the release link 268 away from the back wall 60 of the base 50. The release link 268 pulls the first and second latches 200 and 210 outward, that is, in a first direction 280 away from the back wall 60 of the base 50. The first and second latches 200 and 210 simultaneously pivot to the disengaged condition, against the bias of the springs 228 and 246, respectively. The vehicle occupant does not need to raise the carriage 140 vertically to permit the latches 200 and 210 to move to the disengaged condition.

The downward force on the release lever 260 causes the slider plate 144 and the latches 200 and 210 to move vertically down the base 50. The detent balls 254 engage in a selected one of the pairs of detent openings 130–136 in the base 50. When the vehicle occupant thereafter releases the release lever 260, the springs 228 and 246 urge the latches 200 and 210 to pivot toward the back wall 60 of the base 50. The carriage is in one of the four locking positions set by the detent assembly 250. In any one of these locking positions, at least one of the latches 200 and 210 is in the locking condition, as described above, because of the positioning of the detent openings 130–136 relative to the latch openings 84, 86, 104 and 106.

In the event of vehicle deceleration above a predetermined threshold level, electric circuitry (not shown) of the vehicle actuates the pretensioner 40 in a known manner. The pretensioner 40 tightens the torso portion 28 of the belt webbing 16 about the vehicle occupant and reduces slack in the belt webbing. The force on the belt webbing 16 is transmitted through the D-ring 24 into the carriage 140 and the latches 200 and 210.

If either one of the latches 200 and 210 is in the locking condition when the pretensioner 40 is actuated, that is, if the height adjuster 10 is locked, then the D-ring 24 can not move downward by any significant amount. Specifically, the carriage 140 moves downward along the base 50, if at all, only until the one latch 200 or 210 which is in a locking condition engages the lower end portion of the edge surface defining the opening in which the nose of the one latch is disposed. Further downward movement of the carriage 140 is blocked by the engaged latch 200 or 210. The belt webbing 16 is rapidly tensioned and is tightened about the torso of the vehicle occupant.

It may happen that neither the first latch 200 nor the second latch 210 is in the locking condition when the pretensioner 40 is actuated. This can occur if, for example, the release lever 260 is released by the vehicle occupant when the carriage 140 is at a vertical position in between locking positions, and no force is applied to the carriage to move it to one of the locking positions prior to actuation of the pretensioner 40. In this case, neither the first latch 200 nor the second latch 210 is in the locking condition, the carriage 140 is vertically movable downward relative to the base 50, and the height adjuster 10 is not locked.

If the height adjuster 10 is not locked when the pretensioner 40 is actuated, the tensile force in the belt webbing 16 causes the D-ring 24 to pull the carriage 140 downward along the base 50 until the nose of one of the first and second latches 200 or 210 engages a lower end portion of one of the edge surfaces on the base 50. When this engagement occurs, the height adjuster 10 locks. This downward movement takes a small amount of time and results in a slight delay in the tensioning of the belt webbing 16.

This delay is minimized by the staggered relationship of the two columns 80 and 82 of openings on the base 50. Because of this staggered relationship, one of the two latches 200 and 210 is always in the ready condition—that is, the nose of the one latch is in a latch opening in the back wall 60 of the base 50 in a position to engage that opening's edge surface upon downward movement of the D-ring 24. This is the case even if one of the two latches 200 and 210 is in the intermediate position, with its nose engaging the inner major side surface 62 of the back wall 60 of the base 50.

For example, if the latch 200 is at the vertical position shown in solid lines in FIG. 6, prior to actuation of the pretensioner 40, the second latch 210 is in the intermediate condition, resting on the inner side surface 62 of the back wall 60 of the base 50. The second latch 210 would need to move laterally, that is, in a direction toward the back wall 60 of the base 50 and into the lower second opening 106, in order to be in a position to lock in the lower second opening. The only force for moving the second latch 210 from the intermediate condition into the lower second opening 106 comes from the second spring 246. If the downward acceleration of the carriage 140 due to the pretensioner 40 were sufficiently great, the biasing force of the second spring 246 might be insufficient to overcome the inertia of the second latch 210 and move the second latch fully into the lower second opening 106 before the second latch reaches the lower end portion 120 of the lower second opening. Thus, there could be insufficient engagement of the second latch 210 in the lower second opening 106 to prevent further axial movement of the second latch. The second latch 210 might, therefore, skip past the lower second opening 106.

However, because of the staggered relationship of the first and second columns 80 and 82 of openings, the first latch 200 (FIG. 6) is in the ready condition in the lower second opening 86 when the second latch 210 is in the intermediate condition. Downward movement of the D-ring 24, in response to actuation of the pretensioner 40, pulls the first latch 200 down into engagement with the lower end portion 98 of the edge surface 96 which defines the lower first opening 86. This engagement occurs without the need for any lateral movement of the first latch 200 in a direction toward the back wall 60 of the base 50 or into the lower first opening 86. As a result, the height adjuster 10 locks in the next downward locking position, that is, when the first latch 200 engages the lower end portion 98 of the edge surface 96 which defines the lower first opening 86. This engagement blocks further downward movement of the first latch 200 and, therefore, of the carriage 140 and the D-ring 24. The delay in tensioning of the belt webbing 16 is reduced because the height adjuster 10 locks in the next downward locking position.

The vertical position of the detent openings 130–136, relative to the latch openings 84, 86, 104 and 106, may be selected so that when one of the latches 200 and 210 is in the locking condition in one of the openings, its nose is about 1 mm or so above the lower end portion of the edge surface of the one opening. This configuration provides the vehicle occupant with manually perceptible "stops" in both the upward and downward direction of adjustment of the height adjuster 10, without relying on the engagement of the latch noses 216 and 234 with the edge surface portions 90, 98, 110 and 118. This small upward displacement of the latches 200 and 210 does not significantly delay or hinder locking of the height adjuster 10 when the pretensioner 40 is actuated.

Upward adjustment of the D-ring 24 does not require actuation of the release lever 260. Upwardly directed force on the release lever 260 causes the carriage 140 to move upward. The edge surfaces defining the latch openings on the base 50 engage the back surfaces 218 and 236 of the noses 216 and 234 of the latches 200 and 210, respectively, and cam the latches outward to allow relatively unrestricted upward movement.

From the above description of the invention, those skilled in the art will perceive improvements, changes and modifications in the invention. For example, the height adjuster can be mounted on another portion of the vehicle, such as the seat frame. The base 50 can be curved to match curvature of the B-pillar. The base 50 can be of the type mounted with a single bolt at the top and two hooks at the lower end. The two latches could be parts of a single latch member which rocks from side to side, for example. Further, although the release lever 260 preferably operates in response to a downward force on and downward movement of the manually engageable portion 264, the required motion of the release link 268 can also be achieved by other motions, such as rotary motion of a manually engageable portion of the release lever 260 about an axis generally parallel to the longitudinal axis of the release link. Such operation of the release lever 260 would require the addition of a cam mechanism to the release lever. Such improvements, changes and modifications within the skill of the art are intended to be covered by the appended claims.

Having described the invention, we claim:

1. A seat belt webbing guide height adjuster comprising:

a base having first and second columns of openings disposed in a staggered relationship on opposite sides of an axis of said height adjuster, said first openings and said second openings being placed alternately on either side of said axis;

a carriage supported on said base for axial movement relative to said base;

a seat belt webbing guide on said carriage;

a first latch part on said carriage, said first latch part being movable between a first condition in which said first latch part is movable axially past said first openings and a second condition in which said first latch part is located in one of said first openings to block axial movement of said first latch part and said carriage relative to said base;

a second latch part on said carriage, said second latch part being movable between a first condition in which said second latch part is movable axially past said second of openings and a second condition in which said second latch part is located in one of said second openings to block axial movement of said second latch part and said carriage relative to said base;

biasing means for biasing said first and second latch parts into the second condition; and actuatable release means for moving said first and second latch parts to the first condition;

the axial position of said first and second openings in said base being selected so that at least one of said first and second latch parts is located in one of said openings in said base when said release means is unactuated.

2. A height adjuster as set forth in claim 1 wherein said first and second latch parts are independently movable first and second latches.

3. A height adjuster as set forth in claim 2 wherein said biasing means comprises a first spring member in engagement with said first latch for biasing said first latch into the second condition and a second spring member in engagement with said second latch for biasing said second latch into the second condition independently of said first latch.

4. A seat belt webbing guide height adjuster comprising:

a base having first and second columns of openings disposed in a staggered relationship on opposite sides of an axis of said height adjuster;

a carriage supported on said base for axial movement relative to said base;

a seat belt webbing guide on said carriage;

a first latch part on said carriage, said first latch part being movable between a first condition in which said first latch part is movable axially past said first openings and a second condition in which said first latch part is located in one of said first openings to block axial movement of said first latch part and said carriage relative to said base;

a second latch part on said carriage, said second latch part being movable between a first condition in which said second latch part is movable axially past said second openings and a second condition in which said second latch part is located in one of said second openings to block axial movement of said second latch part and said carriage relative to said base;

biasing means for biasing said first and second latch parts into the second condition; and actuatable release means for moving said first and second latch parts to the first condition;

wherein the axial position of said first and second openings in said base is selected so that at least one of said first and second latch parts is located in one of said openings in said base when said release means is unactuated.

5. A height adjuster as set forth in claim 4 wherein said first openings and said second openings are placed alternately on either side of said axis.

6. A seat belt webbing guide height adjuster comprising:

a base having first and second columns of openings disposed in a staggered relationship on opposite sides of an axis of said height adjuster;

a carriage supported on said base for axial movement relative to said base;

a seat belt webbing guide on said carriage;

a first latch part on said carriage, said first latch part being movable between a first condition in which said first latch part is movable axially past said first openings and a second condition in which said first latch part is located in one of said first openings to block axial movement of said first latch part and said carriage relative to said base;

a second latch part on said carriage, said second latch part being movable between a first condition in which said second latch part is movable axially past said second openings and a second condition in which said second latch part is located in one of said second openings to block axial movement of said second latch part and said carriage relative to said base;

biasing means for biasing said first and second latch parts into the second condition; and actuatable release means for moving said first and second latch parts to the first condition;

wherein said first and second openings in said base define a plurality of vertically spaced locking positions including a lowermost locking position, each one of said first and second latch parts being located in one of said openings in said base when said height adjuster is in any one of said locking positions other than said lowermost locking position.

7. A seat belt webbing guide height adjuster comprising:

a base having first and second columns of openings disposed in a staggered relationship on opposite sides of an axis of said height adjuster;

a carriage supported on said base for axial movement relative to said base;

a seat belt webbing guide on said carriage;

a first latch part on said carriage, said first latch part being movable between a first condition in which said first latch part is movable axially past said first openings and a second condition in which said first latch part is located in one of said first openings to block axial movement of said first latch part and said carriage relative to said base;

a second latch part on said carriage, said second latch part being movable between a first condition in which said second latch part is movable axially past said second openings and a second condition in which said second latch part is located in one of said second openings to block axial movement of said second latch part and said carriage relative to said base;

biasing means for biasing said first and second latch parts into the second condition; and actuatable release means for moving said first and second latch parts to the first condition;

wherein said first and second openings are formed in a wall of said base, said wall of said base having first and second opposite major side surfaces between which said openings extend, each one of said first and second latch parts when in the second condition having a portion disposed between said first and second major side surfaces of said wall of said base; and wherein each one of said first and second latch parts has a portion which engages said first major side surface of said wall and limits movement of the respective latch part toward said second major side surface of said wall when the respective latch part is in the second condition.

8. A seat belt webbing guide height adjuster comprising:

a base having first and second columns of openings disposed in a staggered relationship on opposite sides of an axis of said height adjuster;

a carriage supported on said base for axial movement relative to said base;

a seat belt webbing guide on said carriage;

a first latch part on said carriage, said first latch part being movable between a first condition in which said first latch part is movable axially past said first openings and a second condition in which said first latch part is located in one of said first openings to block axial movement of said first latch part and said carriage relative to said base;

a second latch part on said carriage, said second latch part being movable between a first condition in which said second latch part is movable axially past said second openings and a second condition in which said second latch part is located in one of said second openings to block axial movement of said second latch part and said carriage relative to said base;

biasing means for biasing said first and second latch parts into the second condition; and actuatable release means for moving said first and second latch parts to the first condition;

wherein each one of said first openings has a respective lower end portion, each one of said second openings having a respective upper end portion axially coextensive with one of said lower end portions of said first openings, said second latch part is disposed in one of said upper end portions of said second openings when said first latch part is disposed in one of said lower end portions of said first openings.

* * * * *